(12) United States Patent
Busch et al.

(10) Patent No.: US 11,906,985 B2
(45) Date of Patent: Feb. 20, 2024

(54) VALVE ASSEMBLY AND METHOD FOR REGULATING THE PRESSURE OF A FLUID

(71) Applicant: AVENTICS GMBH, Laatzen (DE)

(72) Inventors: Christian Busch, Hannover (DE); Stefan Tadje, Hannover (DE)

(73) Assignee: Aventics GmbH, Laatzen (DE)

( * ) Notice: Subject to any disclaimer, the term of this patent is extended or adjusted under 35 U.S.C. 154(b) by 0 days.

(21) Appl. No.: 17/757,432

(22) PCT Filed: Dec. 11, 2020

(86) PCT No.: PCT/DE2020/101053
§ 371 (c)(1),
(2) Date: Jun. 15, 2022

(87) PCT Pub. No.: WO2021/121475
PCT Pub. Date: Jun. 24, 2021

(65) Prior Publication Data
US 2023/0010531 A1   Jan. 12, 2023

(30) Foreign Application Priority Data
Dec. 16, 2019 (DE) ................... 10 2019 134 613.4

(51) Int. Cl.
G05D 16/20 (2006.01)
F15B 11/024 (2006.01)
F15B 11/042 (2006.01)

(52) U.S. Cl.
CPC ........ G05D 16/2024 (2019.01); F15B 11/024 (2013.01); F15B 11/0426 (2013.01); G05D 16/204 (2013.01); F15B 2211/513 (2013.01)

(58) Field of Classification Search
CPC ............... F15B 11/0426; F15B 11/024; G05D 16/2024; G05D 16/204
See application file for complete search history.

(56) References Cited

U.S. PATENT DOCUMENTS

| | | | |
|---|---|---|---|
| 5,329,965 A | 7/1994 | Gordon | |
| 2005/0087238 A1* | 4/2005 | Wilson | G05D 16/204 |
| | | | 137/599.07 |
| 2018/0320714 A1* | 11/2018 | Neef | F15B 21/00 |

FOREIGN PATENT DOCUMENTS

| | | |
|---|---|---|
| DE | 27 51 743 C2 | 4/1985 |
| DE | 10 2010 035 747 A1 | 3/2012 |

(Continued)

OTHER PUBLICATIONS

International Search Report corresponding to International Patent Application No. PCT/DE2020/101053, dated Mar. 12, 2021 (5 pages).

*Primary Examiner* — Abiy Teka
(74) *Attorney, Agent, or Firm* — Maginot, Moore & Beck LLP

(57) ABSTRACT

A valve assembly includes a proportional valve having an opening cross section that can be continuously varied by an actuator; a sensor for sensing the valve output pressure; a digital regulating device; and a switching valve disposed parallel to the proportional valve. The opening cross section of the switching valve is smaller than the maximum opening cross section of the proportional valve. The regulating device is programmed (i) to automatically calculate, at runtime, using the currently given valve output pressure and the current position of the actuator, the maximum working pressure achievable at the maximum opening of the proportional valve with the valve, (ii) and to additionally open the switching valve when the computed maximum achievable working pressure falls below a predefinable target working pressure by a definable deviation value.

10 Claims, 3 Drawing Sheets

(56) References Cited

FOREIGN PATENT DOCUMENTS

| | | |
|---|---|---|
| EP | 0 666 792 B1 | 4/1997 |
| EP | 3 699 437 A1 | 8/2020 |
| WO | 2013/135838 A1 | 9/2013 |
| WO | 2013/144598 A1 | 10/2013 |

\* cited by examiner

VALVE ASSEMBLY AND METHOD FOR REGULATING THE PRESSURE OF A FLUID This application is a 35 U.S.C. § 371 National Stage Application of PCT/DE2020/101053, filed on Dec. 11, 2020, which claims the benefit of priority to Serial No. DE 10 2019 134 613.4, filed on Dec. 16, 2019 in Germany, the disclosures of which are incorporated herein by reference in their entirety.

The disclosure relates to a valve assembly and to a method for controlling the pressure of a fluid.

BACKGROUND

In the prior art of open-loop or closed-loop fluidic control systems, maintaining and ensuring a specific target or minimum pressure, which may be variable over time, in a connected volume is often required application-specifically, for example for ensuring a sufficient speed of reaction and/or closing force of tools (laser cutting, welding tongs control), for the faultless three-dimensional shaping of a container parison in the blow molding of containers from preforms or for the sufficiently rapid refilling of a tank or a reservoir. To accomplish such exact pneumatic open-loop or closed-loop control tasks, in the prior art proportional valves with a variable opening cross section are often used. However, in specific applications, the maximum achievable opening cross section of a proportional valve that is suitable in principle may be found not to be sufficient for ensuring a specific target or minimum pressure with respect to specific special system states (for example the finished blow molding of a container or the rapid refilling of a tank). This applies in particular when pressurizing open volumes, for example cutting nozzles or diaphragms with a process gas during laser cutting or the provision of a sufficient stream of cooling air after the final blow molding of glass bottles. In the context of efficient system design and desired use of the same parts, the parallel arrangement of an additional switching valve ("booster") may be beneficial here for such system states, as compared with a higher rating of the proportional valve. Such a system design has the further advantage that the increase in the maximum system performance is not to the detriment of the accuracy of the open-loop or closed-loop control in the performance range of the proportional valve. However, this involves the task of functionally integrating the additional switching valve effectively.

WO 2013/135838 A1 discloses a valve assembly for the stretch blow molding of containers in which, along with a proportional valve, a switching valve or a number of switching valves is or are additionally provided for subjecting the preform to an increased pressure level. For actuating the valves, WO 2013/135838 A1 proposes a time-based control or a control dependent on the position of a stretch rod; it is also disclosed to switch off the proportional valve when a pressure threshold value is reached in the preform. Means for the early determination of the working pressure level achievable as a maximum with the proportional valve or for early detection of the pressure falling below a target or minimum pressure are not disclosed. Furthermore, the provision and integration of a sensor system that is sufficiently suitable for the specific application for sensing the actual pressure in an expanding preform is a relatively complex matter in terms of structural design.

EP 0 666 792 B1 discloses an open-loop and/or closed-loop pressure control device for a fluid medium to be supplied along with the polymer melt to an injection-molding tool in which a number of parallel flow paths leading from a pressure generator to an injection system and each respectively equipped with a medium-inflow control valve are provided. The medium-inflow control valves may be proportional valves. The medium-inflow control valves can be activated by way of a PID controller and a logic circuit in such a way that switching to blocking or letting through is performed in dependence on a pressure gradient sensed by a pressure sensor in the cavity of the injection-molding tool. Means for the early determination of the working pressure level achievable as a maximum with the proportional valve or for early detection of the pressure falling below a target or minimum pressure are not disclosed. Furthermore, the provision and integration of a sensor system that is suitable for the specific application for sensing the actual pressure in the cavity of the injection-molding tool is a relatively complex matter in terms of structural design.

DE 10 2010 035 747 A1, DE 27 51 743 C2 and U.S. Pat. No. 5,329,965 A disclose valve assemblies with a number of electrically actuable individual valves which are electrically connected in parallel and are arranged in a control circuit. The disclosed valve assemblies are of a relatively complex structural design. Means for the early determination of the working pressure level achievable as a maximum with the proportional valve or for early detection of the pressure falling below a target or minimum pressure are not disclosed.

SUMMARY

The disclosure is based on the object of providing a valve assembly for controlling the pressure of a fluid with a proportional valve in the case of which the maintaining of a specific target or minimum pressure in a volume that can be connected to it is ensured by measures of a simple structural design and with which the disadvantages of the prior art are avoided.

The object is achieved according to the disclosure by a valve assembly for controlling the pressure of a fluid and by a method for controlling the pressure of a fluid. Advantageous developments of the disclosure are specified in the subclaims.

The disclosure essentially concerns a valve assembly for controlling the pressure of a fluid, with a proportional valve, having an opening cross section that can be continuously varied by an actuator, a sensor means for sensing the valve output pressure, with a digital controlling device, and also with a switching valve arranged parallel to the proportional valve, wherein the opening cross section of the switching valve is smaller than the maximum opening cross section of the proportional valve and in the case of which the controlling device is programmed to automatically calculate the working pressure achievable as a maximum with the proportional valve when it has its maximum opening width at the running time on the basis of the currently given valve output pressure and the current position of the actuator, and additionally to open the switching valve when the calculated maximum achievable working pressure falls below a predefinable target working pressure by a determinable deviation value. The calculation is based on a modeling of the fluidic application system on the working side of the proportional valve. For this purpose, the programming device of the controlling device comprises instructions with which a suitable technical calculation model corresponding to the respective application system and formed according to the general laws of flow mechanics is presented. The calculation model can be approximately simplified here. In the simplest application, in the calculation model the working pressure corresponds to the sensed valve output pressure. The deviation value in the simplest application may be "0", whereby the opening of the switching valve takes place as soon as the calculated maximum achievable working pressure falls below the predefinable target working pressure. To provide dynamic switching behavior, the deviation value is determined as greater than and unequal to 0, whereby the switching behavior is brought forward in time, and therefore the opening of the switching valve already takes place before the maximum achievable working pressure falls below the predefinable target working pressure.

The disclosure has recognized that, in the context of an efficient system design of a valve assembly with a proportional valve, the maintaining of a specific target or minimum pressure in a volume that can be connected to it is ensured in a simple manner in terms of structural design if the maximum achievable working pressure is calculated at the running time on the basis of the respectively current system state and, dependent on the calculation, a switching valve arranged parallel to the proportional valve is additionally opened when there is a detected imminent fall below the target or minimum pressure. A correspondingly designed valve assembly also makes efficient and accurate pressure control in a connected volume possible in a way that is simple in terms of structural design, while maintaining a specific target or minimum pressure, in particular on an open volume.

Dependent on the respective pneumatic application system, to increase the accuracy of the calculation result, the calculation of the maximum achievable working pressure additionally takes into account the pneumatic resistance (flow resistance) of the further routing of the line from the valve output to the end of the line on the working side of the valve assembly. This variable can for example be approximately taken into account within the technical calculation model as a constant to be determined.

To further increase the accuracy of the calculation result, the calculation of the maximum achievable working pressure additionally takes into account the outflow characteristic of the end of the line on the working side of the valve assembly. Depending on the fluidic application, this may be for example a diaphragm or nozzle, the outflow characteristic of which can for example be approximately taken into account within the technical calculation model as a constant to be determined.

A further increase in the accuracy of the calculation result in the calculation of the maximum achievable working pressure is achieved by the calculation of the maximum achievable working pressure additionally taking into account the drop in supply pressure occurring when there is an increase in the opening cross section of the proportional valve, that is to say the drop in pressure occurring here over the distance between the supply source and the valve inlet.

To stabilize the control behavior of the valve assembly, a switching hysteresis is taken into account in the determination of the opening time of the switching valve.

The disclosure also essentially concerns a method for controlling the pressure of a fluid by a valve assembly with a proportional valve, having an opening cross section that can be continuously varied by an actuator and a sensor means for sensing the valve output pressure, with a digital controlling device, and also with a switching valve arranged parallel to the proportional valve, wherein the opening cross section of the switching valve is smaller than the maximum opening cross section of the proportional valve, wherein the working pressure achievable as a maximum with the proportional valve when it has its maximum opening width is automatically calculated by the digital controlling device at the running time on the basis of the currently given valve output pressure and the current position of the actuator and is compared with a predefinable target working pressure, and the generation of a manipulated variable for the additional opening of the switching valve takes place when the calculated maximum achievable working pressure falls below the predefinable target working pressure by a determinable deviation value.

To increase the accuracy of the calculation result, the calculation of the maximum achievable working pressure additionally takes into account the pneumatic resistance (flow resistance) of the further routing of the line from the valve output to the end of the line.

To further increase the accuracy of the calculation result, the calculation of the maximum achievable working pressure additionally takes into account the outflow characteristic of the end of the line. Depending on the fluidic application, this may be for example a diaphragm or nozzle, the outflow characteristic of which can for example be approximately taken into account within the technical calculation model as a constant to be determined.

A further increase in the accuracy of the calculation result in the calculation of the maximum achievable working pressure is achieved by the calculation of the maximum achievable working pressure additionally taking into account the drop in supply pressure occurring when there is an increase in the opening cross section of the proportional valve.

To stabilize the control behavior of the valve assembly, a switching hysteresis is taken into account in the determination of the opening time of the switching valve.

BRIEF DESCRIPTION OF THE DRAWINGS

Further advantages of the disclosure are presented in more detail below together with the description of a preferred exemplary embodiment of the disclosure on the basis of the figures, in which.

DETAILED DESCRIPTION

Figure 1:
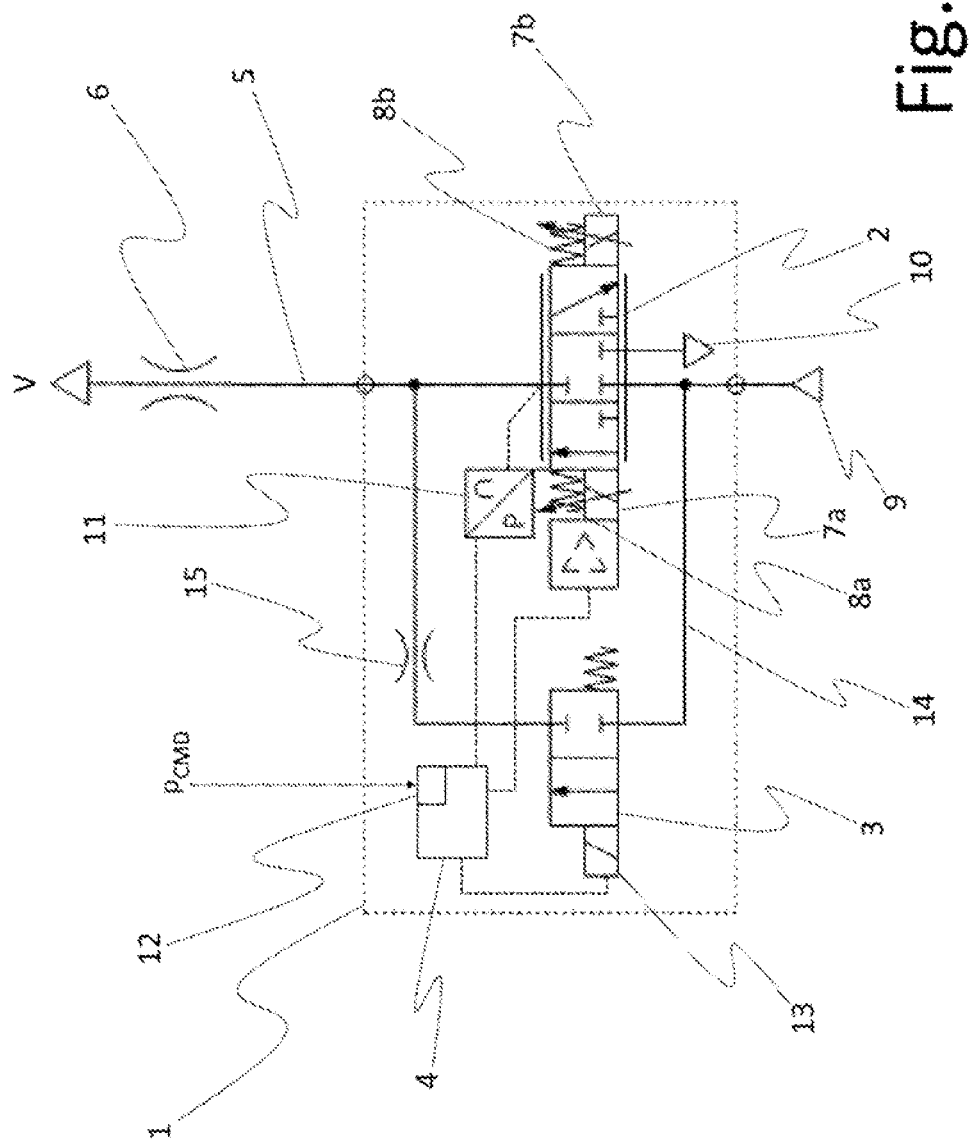
FIG. 1 shows an equivalent circuit diagram of a pneumatic valve assembly.

FIG. 1 shows a simplified pneumatic equivalent circuit diagram of the valve assembly 1. The valve assembly 1 comprises the proportional valve 2, the switching valve 3 and the microcontroller 4. The essential functional components of the valve assembly 1 are formed in a common housing, symbolized by a dashed frame. The valve assembly 1 is connected via the working line 5 to a volume V (not shown in any more detail in FIG. 1), which is an open volume, such as for example the processing head of a laser cutting device. For this purpose, the working line 5 opens into the volume V at its line end, the line end of the working line 5 in the exemplary embodiment according to FIG. 1 being designed as an open diaphragm 6, which describes a sudden cross-sectional constriction at the end of the line. The proportional valve 2 is designed as a 3/3-way proportional valve. In its rest position in the de-energized state, the proportional valve 2 assumes its closed central position (NC), in which the working line 5 is shut off. To act on the working line 5, the proportional valve 2 can be switched by the proportional solenoid 7a against the spring loading of the mechanical return spring 8b into a first switching position, in which it connects the working line 5 to the compressed air supply 9 with a variable valve opening cross section. To vent the working line 5, the proportional valve 2 can be switched by the proportional solenoid 7b against the spring loading of the mechanical return spring 8a into a second switching position, in which it connects the working line 5 to the vent 10 with a variable valve opening cross section. The proportional solenoids 7a and 7b are electrically activated via the microcontroller 4 integrated in the housing of the valve assembly 1, which serves as a digital controlling device of the valve assembly 1. The microcontroller 4 is formed as a "single-board computer (SBC)" in which all the electronic components necessary for operation (CPU, memory, input and output interfaces, A/D converter, DMA controller, etc.) are combined on a single PCB. The microcontroller 4 receives from the pressure sensor 11 a continuous electrical signal, which represents the respectively current valve output pressure at the proportional valve 2. The microcontroller 4 is also formed with the data communication interface 12, with which it can be connected to a higher-level programmable logic controller (PLC, not shown in any greater detail in FIG. 1). The microcontroller 4 receives from the programmable logic controller at the running time a dynamically predefinable target working pressure $p_{CMD}$. The microcontroller 4 is programmed to automatically calculate the working pressure achievable as a maximum in each case when the proportional valve has its maximum opening width at the running time on the basis of the currently given valve output pressure and the current position of the actuator of the proportional valve 2 known to it from the current activation state, and to compare it with the respectively predefined target pressure. Furthermore, the microcontroller 4 is programmed additionally to open the switching valve 3 when the calculated maximum achievable working pressure falls below the currently predefined target working pressure $p_{CMD}$ by a determinable deviation value in that it activates the switching magnet 13. The switching valve 3 is arranged in the bypass line 14 running between the compressed air supply 9 and the working line 5 and blocks it in its rest position in the de-energized state. In its switching position, the switching valve 3 opens an additional opening cross section between the compressed air supply 9 and the working line 5. The cross-sectional constriction 15 in the bypass line 14 serves to symbolize the characteristic that the switchable line cross section of the bypass line is smaller than the maximum opening width of the proportional valve 2. This can be achieved in practice by the nominal width of the switching valve 3, the cross section of the bypass line 14 or a diaphragm or throttle. The condition that the switchable line cross section of the bypass line 14 is smaller than the maximum opening width of the proportional valve 2 must be satisfied in order that the controlled combined air volume can be increased seamlessly.

Figure 2:
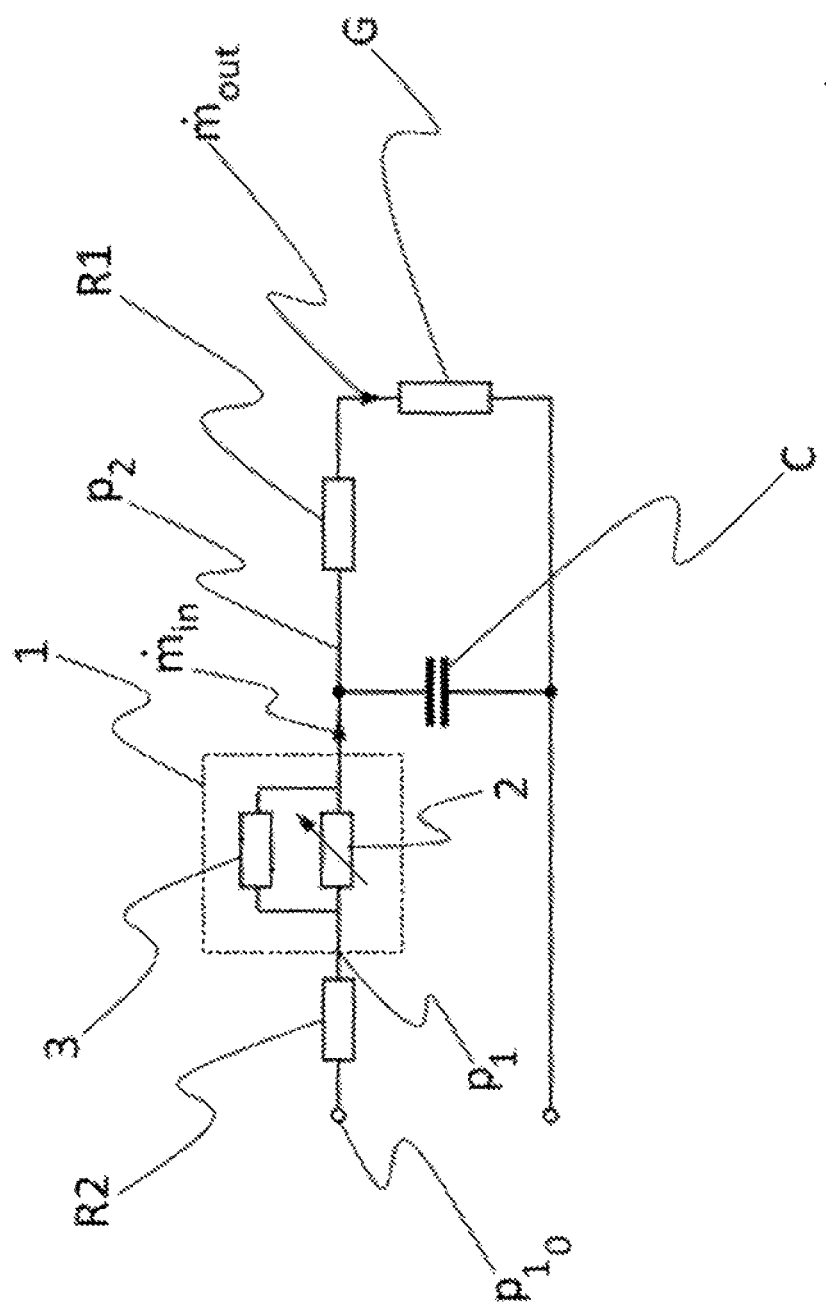
FIG. 2 shows an electrical equivalent circuit diagram of the valve assembly as shown in FIG. 1.

FIG. 2 shows an electrical equivalent circuit diagram of the valve assembly 1 as shown in FIG. 1 to illustrate the parameters to be taken into account when designing a suitable technical calculation model. The pneumatic application system is acted upon on the input side by the compressed air supply 9 with the supply pressure $p_{1_0}$. Until it enters the valve assembly 1, the air stream is subjected to the pneumatic resistance R2, which is characterized by the cross section and the nature of the corresponding line routing. The compressed air supply to the valve assembly 1 takes place on the supply side with the pressure $p_1$. Starting from the valve assembly 1, compressed air is introduced into the working side of the pneumatic application system as a mass flow $\dot{m}_{in}$ with the pressure $p_2$ controlled by the valve assembly 1. Up to the end of the line, the air stream is subjected to the further pneumatic resistance R1, which is characterized by the cross section and the nature of the corresponding further line routing. As a mass flow $\dot{m}_{out}$, the air stream finally passes through the end of the line designed as a diaphragm 6, wherein the outflow characteristic of the diaphragm 6 can be characterized by the conductance G and leads to the application of pressure to the volume V, which is identified in the electrical equivalent circuit diagram of FIG. 2 as capacitor C.

On the basis of the electrical equivalent circuit diagram in FIG. 2, a suitable technical calculation model is shown below: the air stream introduced through the valve assembly 1 into the working line 5 can generally be described as follows as mass flow $\dot{m}_{in}$:

$$\dot{m}_{in} = \Psi(p_{1_A}, p_{2_A}) \cdot p_1 \cdot (f_1(\ldots) \cdot x(t) + f_2(\ldots) \cdot A_V \cdot u(t)),$$

with $\Psi(p_{1_A}, p_{2_A})$—outflow function, $f_1(\ldots)$—general functional relationship of proportional valve 1, $f_2(\ldots)$—general functional relationship of switching valve 3, $x(t)$—variable opening cross section of proportional valve, $u(t)$—switching state of switching valve, $A_V$—opening cross section of switching valve, R—general gas constant, $\vartheta$—temperature.

The pressure increase $\dot{p}_2$ for a constant working volume V (=capacitor C in the equivalent circuit diagram of FIG. 2) can be described by:

$$\dot{p}_2 = \frac{R\vartheta}{V} \cdot (\dot{m}_{in} - \dot{m}_{out}) = \frac{R\vartheta}{C} \cdot \dot{m}_{in} - \frac{R\vartheta}{C} \cdot \frac{G}{R1 \cdot G + 1} \cdot p_2 = c_1 \cdot \dot{m}_{in} - c_2 \cdot p_2,$$

with the variables $c_1$ and $c_2$ having to be determined approximately as constants for the respective pneumatic application system.

In order that a predefinable target working pressure $p_{CMD}$ can be achieved with the valve assembly 1, the condition $\dot{m}_{in} > \dot{m}_{out}$ must be satisfied. It follows from this that the switching valve 3 must always be opened when the following applies:

$$\dot{m}_{out}|_{p=p_{CMD}} = \frac{G}{R1 \cdot G + 1} \cdot p_{CMD} =$$
$$c_2 \cdot p_{CMD} > \dot{m}_{in_{max}} = \Psi(p_{1_A}, p_{2_A}) \cdot p_1 \cdot x_{max} = c_3(p_{1_A}, p_{2_A}) \cdot p_{max},$$

where the variable $c_3$ is to be determined approximately as a constant for the respective pneumatic application system.

In order that the controlled combined controlled air volume of the proportional valve 2 and the switching valve 3 can be increased seamlessly, it is also necessary to satisfy the condition that the switchable line cross section of the bypass line 14 is smaller than the maximum opening width of the proportional valve 2:

$$f_1(\ldots) \cdot x_{max} > f_2(\ldots) \cdot A_V.$$

With the increase in the flow through the proportional valve 2, the supply pressure $p_{1_0}$ drops, which can be described in a simplified form as follows:

$$p_1(\dot{m}(x)) = p_{1_0} - a_{p1}\dot{m}(x) \rightarrow p_x(x) \approx p_{1_0} - a_{px} \cdot x.$$

When the switching valve 3 is switched off with u=0, the equation for the mass flow $\dot{m}_{in}$ introduced into the working line 5 changes as follows:

$$\dot{m}_{in} = \frac{\Psi(p_{1_A}, p_{2_A}) \cdot p_{10} \cdot f_1(\ldots) \cdot x(t)}{1 + \Psi(p_{1_A}, p_{2_A}) \cdot a_{p1} \cdot f_1(\ldots) \cdot x(t)} \approx \Psi \cdot f_1 \cdot p_1 \cdot x(t) - \Psi \cdot f_1 \cdot a_{px} \cdot x^2(t).$$

Based on this, a suitable calculation algorithm for the working pressure achievable as a maximum with the proportional valve 2 when it has the maximum opening width can be derived as follows:

From the equations shown for the pressure increase $\dot{p}_2$ and the mass flow $\dot{m}_{in}$ introduced into the working line 5 when the switching valve 3 is switched off, taking into account the supply pressure drop, the calculable pressure increase $\dot{p}_2$ results in a simplified form in:

$$\dot{p}_2 \approx c_1 \, (c_{3_1} \cdot x(t) - c_{3_2} \cdot x^2(t) - c_2 \cdot p_2(t)).$$

so that the maximum achievable working pressure $p_{2_{max}}$ can be determined as follows:

$$p_{2_{max}} \approx \frac{c_{3_1}}{c_2} \cdot x_{max} - \frac{c_{3_2}}{c_2} \cdot x_{max}^2.$$

The above equation can be discretized as follows $$p_k = \frac{c_{3_1}}{c_2} \cdot x_k - \frac{c_{3_2}}{c_2} \cdot x_k^2 - \frac{1}{c_1 \cdot c_2} p_{2_k}.$$

The results of the above calculation are continuously accumulated in a buffer memory during the running time. On the basis of the buffer data collection, to estimate the maximum achievable working pressure at the running time the parameters $$a_0 = \frac{c_{3_1}}{c_2} \text{ and } a_1 = \frac{c_{3_2}}{c_2}$$

required for the actuation of the switching valve 3 are continuously solved as an optimization task $$J = \frac{1}{2} \min_{a_0, a_1} \{\underline{e}^T \underline{e}\}$$

with $$\underline{e} = \underline{p} - a_0 \cdot \underline{x} + a_1 \cdot \underline{x}^2.$$

Both the data accumulation and the optimization calculation are performed at the running time as background processes.

On the basis of the calculation bases presented above, the switching time for opening the switching valve 3 is defined by $$p_{CMD} > p_{2_{max}} = f(p_1, x_{max}).$$

On the basis of this, the following switching rules can be formulated in practice to further improve the switching behavior:

To make the switching behavior dynamic, first the general parameter $p_{offset}$ is introduced, with the effect that the switching behavior is brought forward in time by an additional, predefinable deviation value>0, i.e. the switching valve is already opened before the maximum achievable working pressure falls below the predefinable target working pressure:

$$u = \begin{cases} 1, & p_{CMD} - p_{offset} \geq p_{2_{max}} \\ 0, & \text{otherwise} \end{cases}$$

Bouncing of the valve assembly 1 caused by frequent switching on and off can be avoided by introducing a switching hysteresis with the additional parameters $p_{thr_{upper}}$ and $p_{thr_{lower}}$ as a result of the following switching rules that stabilize the switching behavior:

$$\begin{cases} 1, & u_{k-1} = 0 \land p_{CMD} - p_{offset} + p_{thr_{upper}} \geq p_{2_{max}} \land p_{CMD} > p_2 \\ 1, & u_{k-1} = 1 \land p_{CMD} - p_{offset} + p_{thr_{lower}} \geq p_{2_{max}} \\ 0, & u_{k-1} = 0 \land p_{CMD} - p_{offset} + p_{thr_{upper}} < p_{2_{max}} \\ 0, & u_{k-1} = 1 \land p_{CMD} - p_{offset} + p_{thr_{lower}} \geq p_{2_{max}} \lor p_{CMD} < p_{CMD_{min}} \\ 0, & \forall_{k-1} \leq 0 \end{cases}$$

The parameter $p_{CMD_{min}}$ is an additional minimum setpoint, below which the switching valve is switched off and the setpoint pressure $p_{CMD}$ is only set via the proportional valve 2.

Figure 3:
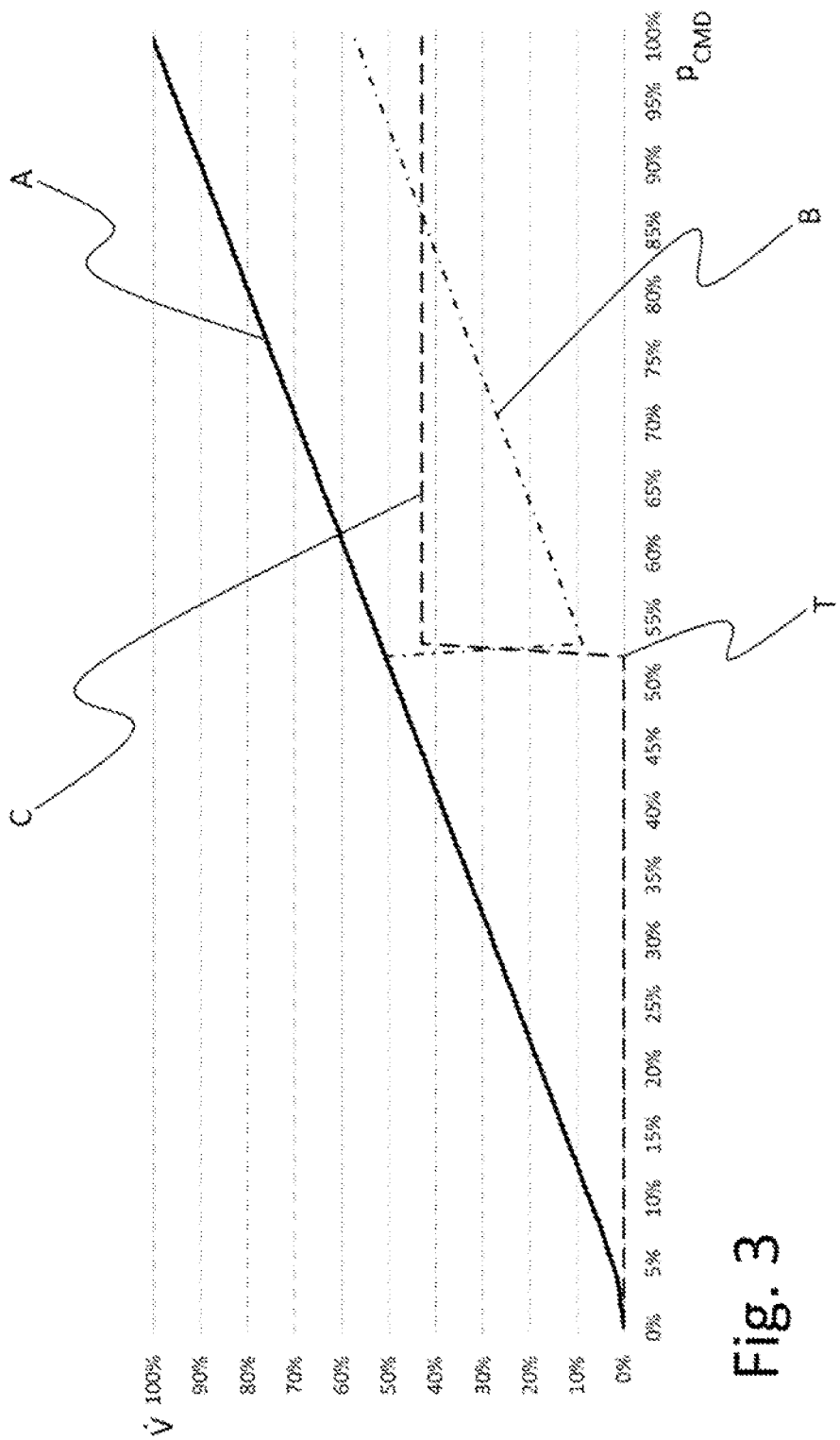
FIG. 3 shows a diagram to illustrate the composition of the air volume delivered by the valve assembly.

FIG. 3 shows a diagram of the air stream controlled by the valve assembly 1 in dependence on the predefinable target working pressure $p_{CMD}$, the x axis representing the increasing default value $p_{CMD}$ and the y axis the air volume $\dot{V}$ delivered by the valve assembly into the working side of the pneumatic application system. The straight line A shows the total air volume introduced from the valve assembly into the working side of the pneumatic application system with increasing default value $p_{CMD}$. With increasing default value $p_{CMD}$, the total air volume A is made up of the partial air volume B delivered by the proportional valve 2 and the partial air volume C additionally delivered by the switching valve 3 as from the opening of the switching valve 3 at the switching time T. Up until the switching time T, the total air volume A delivered by the valve assembly is identical to the partial air volume B delivered by the proportional valve 2, which is why, starting from the origin of the coordinates up to the switching time T, graph B initially runs identically to straight line A, i.e. is congruent with it. With the opening of the switching valve 3, the supply pressure $p_{1_0}$ drops, which is why, from this time, the partial air volume B delivered by the proportional valve 2 also initially drops. Since, from this time, the partial air volume C delivered by the switching valve 3 at the same time suddenly increases, the combined total air volume A delivered overall by the valve assembly 1 continues to increase linearly.

LIST OF REFERENCE SIGNS

1 Valve assembly
2 Proportional valve
3 Switching valve
4 Microcontroller
5 Working line 6 Diaphragm
7a, 7b Proportional solenoid
8a, 8b Return spring
9 Compressed air supply
10 Venting
11 Pressure sensor
12 Data communication interface
13 Switching magnet
14 Bypass line
15 Cross-sectional constriction

The invention claimed is:

1. A valve assembly for controlling a pressure of a fluid, comprising:
an actuator;
a proportional valve operably connected to the actuator, the proportional valve having an opening cross section that can be continuously varied by the actuator;
a sensor operably connected to the proportional valve and configured to sense a valve output pressure of the proportional valve;
a digital controlling device; and
a switching valve arranged parallel to the proportional valve and having an opening cross section,
wherein the opening cross section of the switching valve is smaller than a maximum opening cross section of the proportional valve,
wherein, during a running time, the digital controlling device is configured to automatically calculate a working pressure achievable as a maximum with the proportional valve when the proportional valve is configured at the maximum opening cross section based on a currently given valve output pressure from the sensor and a current position of the actuator, and
wherein the digital controlling device is further configured to open the switching valve when the calculated maximum achievable working pressure falls below a predefinable target working pressure by a determinable deviation value.

2. The valve assembly as claimed in claim 1, wherein the calculation of the maximum achievable working pressure is further based on a pneumatic resistance of a further routing of a line from a valve output to an end of the line on a working side of the valve assembly.

3. The valve assembly as claimed in claim 2, wherein the calculation of the maximum achievable working pressure is further based on an outflow characteristic of the end of the line on the working side of the valve assembly.

4. The valve assembly as claimed in claim 1, wherein the calculation of the maximum achievable working pressure is further based on a drop in supply pressure occurring when there is an increase in the opening cross section of the proportional valve.

5. The valve assembly as claimed in claim 1, wherein, to stabilize a control behavior, a determination of an opening time of the switching valve is based on a switching hysteresis.

6. A method for controlling a pressure of a fluid by a valve assembly, the method comprising:
controlling an opening cross section of a proportional valve of the valve using an actuator;
sensing, using a sensor, a valve output pressure of the proportional valve, wherein a switching valve of the valve assembly is arranged parallel to the proportional valve, wherein an opening cross section of the switching valve is smaller than a maximum opening cross section of the proportional valve;
automatically calculating at a running time, using a digital controlling device, a working pressure achievable as a maximum with the proportional valve when the proportional valve is at a maximum opening cross section based on a currently given valve output pressure and a current position of the actuator;
comparing the calculated working pressure with a predefinable target working pressure; and
generating a manipulated variable for an additional opening of the switching valve when the calculated maximum achievable working pressure falls below a predefinable target working pressure by a determinable deviation value.

7. The method as claimed in claim 6, wherein the calculation of the maximum achievable working pressure is further based on a pneumatic resistance of a further routing of a line from a valve output to an end of the line.

8. The method as claimed in claim 7, wherein the calculation of the maximum achievable working pressure is further based on an outflow characteristic of the end of the line.

9. The method as claimed in claim 6, wherein the calculation of the maximum achievable working pressure is further based on a drop in supply pressure occurring when there is an increase in the opening cross section of the proportional valve.

10. The method as claimed in claim 6, further comprising:
stabilizing a control behavior of the valve assembly by determining an opening time of the switching valve based on a switching hysteresis.

* * * * *